United States Patent [19]
Linkner, Jr. et al.

[11] Patent Number: 5,890,364
[45] Date of Patent: Apr. 6, 1999

[54] MASTER CYLINDER HAVING A SINGLE SERVICE PISTON WITH COMPENSATION AND DAMPING SECTIONS

[75] Inventors: Herbert L. Linkner, Jr., Dexter; Wendell D. Tackett, Ann Arbor, both of Mich.

[73] Assignee: Kelsey-Hayes Company, Livonia, Mich.

[21] Appl. No.: 813,790

[22] Filed: Mar. 7, 1997

Related U.S. Application Data

[60] Provisional application No. 60/013,006, Mar. 7, 1996.
[51] Int. Cl.$^6$ ...................................................... B60T 11/06
[52] U.S. Cl. .............................. 60/561; 60/581; 60/589; 92/62; 92/151
[58] Field of Search ........................... 60/561, 581, 589; 92/62, 63, 76, 151

[56] References Cited

U.S. PATENT DOCUMENTS

| | | | |
|---|---|---|---|
| 2,074,416 | 3/1937 | Oliver | 60/561 |
| 3,079,757 | 3/1963 | Vick . | |
| 3,605,410 | 9/1971 | Herriott | 60/561 |
| 3,729,932 | 5/1973 | Nakashima | 60/561 |
| 3,800,540 | 4/1974 | Papiau | 60/581 |
| 3,818,706 | 6/1974 | Gaiser | 60/586 |
| 3,852,962 | 12/1974 | Warwick | 60/561 |
| 4,072,012 | 2/1978 | Kawakami . | |
| 4,074,532 | 2/1978 | Hayashida et al. | 60/581 |
| 4,078,384 | 3/1978 | Shutt . | |
| 4,154,260 | 5/1979 | Shutt . | |
| 4,161,105 | 7/1979 | Hagiwara . | |
| 4,170,386 | 10/1979 | Shutt . | |
| 4,301,653 | 11/1981 | Carre et al. | 60/561 |
| 4,384,458 | 5/1983 | Kawaguchi . | |
| 4,455,831 | 6/1984 | Maehara . | |
| 4,510,752 | 4/1985 | Gaiser . | |
| 4,900,103 | 2/1990 | Stegmaier . | |
| 5,044,161 | 9/1991 | Schiel et al. | 60/589 |
| 5,477,681 | 12/1995 | Tackett . | |

FOREIGN PATENT DOCUMENTS

| | | | |
|---|---|---|---|
| 2228646 | 1/1975 | France | 60/581 |
| 1030686 | 5/1958 | Germany | 60/581 |

OTHER PUBLICATIONS

Society of Automotive Engineers, Inc. (SAE) Technical Paper Series, #820025 "Next Generation Master Cylinder—Cartridge Type", R.F. Gaiser and L.R. Myers, Feb. 1982.

Society of Automotive Engineers, Inc. (SAE) Technical Paper Series, #870258 "Recessed Series Master Vac and Master Cylinder Assembly", L.P. Rossigno and J.E. Steer, Feb. 1987.

*Primary Examiner*—F. Daniel Lopez
*Attorney, Agent, or Firm*—MacMillan, Sobanski & Todd, LLC

[57] ABSTRACT

An improved compensation piston arrangement for use with a dual circuit master cylinder having a single service piston for simultaneously pressurizing a first fluid chamber and a second fluid chamber, wherein the compensation piston arrangement provides for pressure balancing between the first fluid chamber and the second fluid chamber to compensate for minor normal differences between the first and second fluid chamber. The compensation piston arrangement includes a movable compensation piston slidably disposed within a bore of a compensation housing, wherein the housing defines a pair of end stops positioned on opposing sides of the compensation piston. The bore is in fluid communication with the fluid chambers such that the pressure within the first fluid chamber acts on a first side of the compensation piston, and the pressure within the second fluid chamber acts on a second end of the compensation piston which is opposite the first end. The compensation housing can be incorporated within the service piston or can be remotely located from the master cylinder.

14 Claims, 6 Drawing Sheets

MASTER CYLINDER HAVING A SINGLE SERVICE PISTON WITH COMPENSATION AND DAMPING SECTIONS

This application claims benefit of Provisional Application 60/013,006, filed Mar. 7, 1996.

BACKGROUND OF THE INVENTION

This invention relates in general to vehicle hydraulic brake systems and in particular to a dual circuit master cylinder adapted for use in such a vehicle hydraulic brake systems.

Most vehicles are equipped with a brake system for retarding or stopping movement of the vehicle in a controlled manner. A typical brake system for an automatic or light truck includes a disc brake assembly for each of the front wheel of the vehicle, and either a disc or drum brake assembly for each of the rear wheels of the vehicle. The brake assemblies are actuated by hydraulic pressure generated when an operator of the vehicle depresses a brake pedal. A typical hydraulic brake system includes a first hydraulic circuit and a second hydraulic circuit. The first and second circuits can be connected to the wheel brakes by various configurations, such as a diagonally split arrangement or a vertically split arrangement. In a diagonally split arrangement, the first circuit is connected to one of the front wheel brakes and to one of the rear wheel brakes on the opposite side from the connected front wheel brake. The second circuit is then connected to the other one of the front wheel brakes and the other one of the rear wheel brakes on the opposite side of the connected front wheel brake. In a vertically split arrangement, the first circuit is connected to the front wheel brakes, and the second circuit is connected to the rear wheel brakes. The use of two brake circuits helps to maintain a source for braking of the vehicle in case of failure of one of the brake circuits.

A dual circuit or tandem master cylinder is used to supply pressurized fluid to the first and second brake circuits. A conventional tandem master cylinder includes a pair of service pistons which are operatively connected to the brake pedal operated by the vehicle operator. Actuation of the brake pedal causes movement of the pistons which energize or pressurize first and second fluid chambers in the master cylinder which are operatively connected in fluid communication with the first and second brake circuits, respectively. However, the use of a master cylinder having two pistons can have drawbacks should one of the two hydraulic brake circuits fail. For example, upon failure of one of the two brake circuits, the stroke of the associated piston of the master cylinder can increase in length due to abnormal movement of the associated piston, thereby causing a relatively large brake pedal drop.

It is known to use a master cylinder having a single service piston. In a master cylinder having a single piston, the movement of the piston simultaneously energizes the first and second fluid chambers. However, the respective pressures within the first and second hydraulic circuits can fluctuate with respect to each other because of different volumetric requirements of the associated hydraulic circuits due to various factors. For example, the fluctuations can result from different manufacturing tolerances, uneven brake pad or lining wear, or differences in the various components in the disc and drum hydraulic brake circuits.

It would be desirable to provide a compensation device for a master cylinder having a single service piston for use in a hydraulic brake circuit which is simple, inexpensive to manufacture, and does not cause a relatively large pedal drop in case of failure of one of the two hydraulic circuits.

BRIEF SUMMARY OF THE INVENTION

This invention relates in general to an improved compensation device or assembly for use in a dual circuit master cylinder having a single service piston for pressurizing first and second fluid chambers, wherein the compensation assembly provides for balancing or equalizing of the functions to maintain generally equal pressures within the first and second fluid chambers to compensate for minor normal differences between brake circuit displacement. The compensation assembly includes a movable compensation piston slidably disposed within a bore of a compensation housing, wherein the compensation housing defines a pair of end stops positioned on opposed sides of the compensation piston. The bore is in fluid communication with the fluid chambers such that the pressure within the first fluid chamber acts on a first side of the compensation piston, and the pressure within the second fluid chamber acts on a second end of the compensation piston which is opposite the first end. In one embodiment of the invention, the compensation piston arrangement is incorporated within a bore of the service piston. In another embodiment of the invention, the compensation piston arrangement is located remotely from the master cylinder having a single service piston arrangement. In yet another embodiment of the invention, a reduced diameter orifice is utilized in cooperation with the compensation assembly to provide damping for pressure pulses which can travel through the hydraulic fluid, thereby causing an undesirable noise.

Other advantages of this invention will become apparent to those skilled in the art from the following detailed description of the preferred embodiments, when read in light of the accompanying drawings.

DETAILED DESCRIPTION OF THE INVENTION

Figure 1:
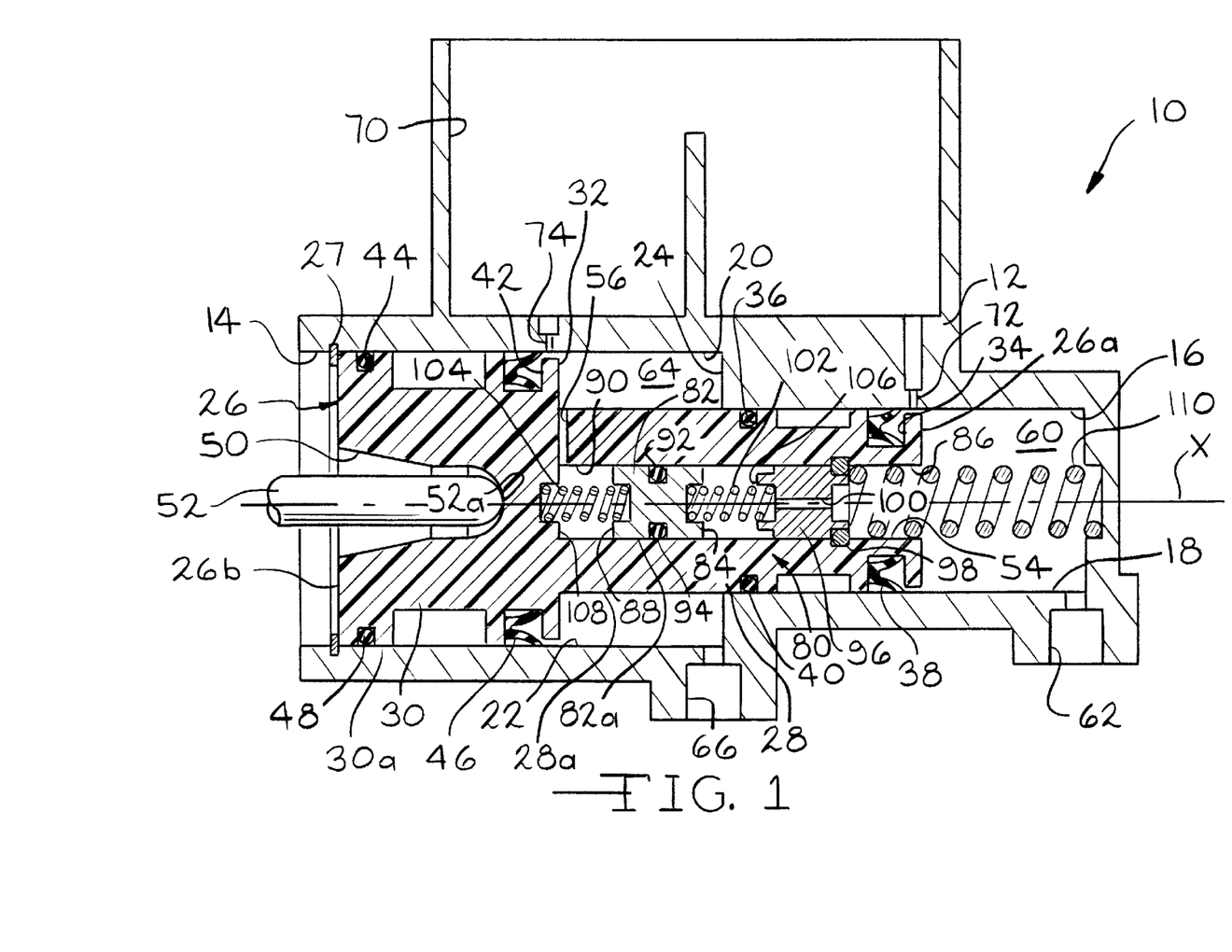
FIG. 1 is sectional view of a first embodiment of a master cylinder, in accordance with the invention.

Referring now to the drawings, there is illustrated in FIG. 1 a first embodiment of a master cylinder, indicated generally at 10, in accordance to the invention. The master cylinder 10 is adapted to be installed in a vehicle brake system (not shown). The master cylinder 10 includes a housing 12 having a stepped cylindrical bore 14 formed therein and defining an axis "X". The bore 14 has a cylindrical first bore section 16 defining a first cylindrical wall 18. The bore 14 also has a cylindrical second bore section 20 defining a second cylindrical wall 22. The first cylindrical wall 18 defines an internal diameter which is smaller than an internal diameter defined by the second cylindrical wall 22 of the second cylindrical bore section 20. A shoulder 24 is formed between the first and second cylindrical walls 18 and 22. Preferably, the first bore section 16 is concentric with the second bore section 20. The bore 14 can be easily manufactured, for example, by a single rotating cutting tool having a pair of cutting bits corresponding to the dimensions of the first and second bore sections 16 and 20.

The master cylinder 10 further includes a stepped cylindrical service piston 26 slidably disposed within the cylindrical bore 14. The service piston 26 is retained in the bore 14 by suitable means, such as a snap ring 27. The service piston 26 includes first and second ends 26a and 26b and is formed from a suitable material, such as plastic or metal. The service piston 26 includes two main portions, a first cylindrical portion 28 and a second cylindrical portion 30. The first portion 28 defined an outer diameter which is less than an outer diameter defined by the second portion 30. A shoulder 32 is formed between the first and second portions 28 and 30. The first portion 28 has a pair of circumferential grooves 34 and 36 formed in an outer surface 28a thereof. Disposed within the circumferential groove 34 is a first annular lip seal 38 which engages and forms a fluid seal with the first cylindrical wall 18. Disposed within the circumferential groove 34 is a first elastomeric seal 40, such as an O-ring, which engages and forms a fluid seal with the first cylindrical wall 18. The second portion 30 of the service piston 26 includes a pair of circumferential grooves 42 and 44 formed in an outer surface 30a thereof. Disposed within the circumferential groove 42 is a second annular lip seal 46 which engages and forms a fluid seal with the second cylindrical wall 22. Disposed within the circumferential groove 44 is a second elastomeric seal 48, such as an O-ring, which engages and forms a fluid seal with the second cylindrical wall 22.

The service piston 26 is provided with an axially located recess 50 formed in the second end 26b thereof A first end 52a of an input rod 52 is operatively disposed in the recess 50 of the service piston 26. The opposite end of the input rod 52 is operatively attached to a brake pedal (not shown) of a vehicle (not shown) in which the master cylinder 10 is installed. The service piston 26 includes an axial bore 54 formed in the first end 26a thereof and extends through the first portion 28. A transverse passageway or orifice 56 extends through the service piston 26 from the axial bore 54 to the first portion 28. Preferably, the orifice 56 has a relatively small diameter cross-section, the reason for which will be explained in detail below. If desired, a plurality of passageways 56 can be formed through the first portion 28 of the service piston 26.

The closed end of the first bore section 16, the first cylindrical wall 18, the first end 26a of the service piston 26, and the first lip seal 38 cooperate to generally define a variable volume first fluid chamber 60 for containment of hydraulic fluid. The first end 26a of the service piston 26 generally defines a boundary wall, in which movement of the service piston 26 enables the volume of the first chamber 60 to increase or decrease. The first fluid chamber 60 is in fluid communication with a first hydraulic brake circuit (not shown) of the vehicle in which the master cylinder 10 is installed via a first outlet port 62.

The second bore section 20, the shoulder 32 of the service piston 26, the outer surface 28a of the first portion 28 of the service piston 26, the lip seal 46, and the first seal 40 cooperate to generally define a variable volume annular second fluid chamber 64 for containment of hydraulic fluid. The shoulder 32 generally defines a boundary wall, in which movement of the service piston 26 enables the volume of the second chamber 64 to increase or decrease. The second fluid chamber 64 is in fluid communication with a second hydraulic brake circuit (not shown) of the vehicle in which the master cylinder 10 is installed via a second outlet port 66.

The master cylinder 10 further includes a hydraulic fluid reservoir 70 for retaining a volume of hydraulic fluid. The reservoir 70 can be integral with the housing 12, as shown in FIG. 1, or can be a separate component which is connected to the master cylinder 10. The reservoir 70 is in fluid communication with the first fluid chamber 60 via a first reservoir port 72 formed through the housing 12 when the service piston 26 is at a non-actuated or rest position, as shown in FIG. 1. The reservoir 70 is also in fluid communication with the second fluid chamber 64 via a second reservoir port 74 formed through the housing 12 when the service piston 26 is at a non-actuated or rest position, as shown in FIG. 1.

The master cylinder 10 further includes a compensation assembly, generally indicated at 80. Although the compensation assembly 80 is shown disposed within the axial bore 54 of the service piston 26, the compensation assembly 80 can be remotely located from the service piston 26, as will be described in other embodiments of the invention below. The first portion 28 of the service piston 26 defines a compensation housing, while the axial bore 54 defines a bore formed through the compensation housing. A relatively small cylindrical compensation piston 82 is slidably disposed within the axial bore 54. The compensation piston 82 has a first end 84 facing a first portion 86 of the axial bore 54 which is in fluid communication with the first fluid chamber 60. The compensation piston 82 has a second end 88 facing a second portion 90 of the axial bore 54 which is fluid communication with the second fluid chamber 64. An elastomeric seal 92 is disposed within a circumferential groove 94 formed in an outer cylindrical wall 82a of the compensation piston 82 and which engages and forms a fluid seal with the wall of the axial bore 54.

A fixed spring retainer 96 is positioned in the axial bore 54 and can be retained by any suitable manner, such as by a snap ring 98. Alternatively, the retainer 96 can be threadably fastened to the service piston 26. The spring retainer 96 has an axial passageway or orifice 100 formed therethrough. Preferably, the orifice 100 has a relatively small diameter cross-section, the reason for which will be explained in detail below. The compensation piston 46 is positioned within the axial bore 54 by a pair of opposing springs 102 and 104. The spring 102 is positioned between a wall 106 of the spring retainer 96 and the first end 84 of the compensation piston 82. The spring 104 is positioned between the second end 88 of the compensation piston 82 and an end wall 108 defined at the closed end of the axial bore 54. The wall 106 of the spring retainer 96 and the end wall 108 of the axial bore 54 define a pair of opposed piston stops which restrict the travel length of the compensation piston 82 within the axial bore 54. The pair of piston stops can be integral portions formed in the compensation housing or can be separate structures, such as snap rings (not shown) retained within the axial bore 54. When the pressures in the first and second fluid chambers 60 and 64 are equal, the springs 102 and 104 are operative to bias the compensation piston 82 generally centrally between the springs 102 and 104, thereby allowing movement of the compensation piston 82 within the axial bore 54 in response to differences in pressure between the first and second fluid chambers 60 and 64. Alternatively, a single spring (not shown) can be used in place of the pair of springs 102 and 104 to centrally locate the compensation piston 82 within the axial bore 54.

As mentioned above, the service piston 26 is shown in the non-actuated or rest position in FIG. 1. In this position, the service piston 26 is biased leftward, when viewing FIG. 1, against the snap ring 27 by a return spring 110 positioned between the closed end of the bore 14 of the housing 12 and the spring retainer 96. Of course, the return spring 110 can be positioned so as to engage the first end 26a of the service piston 26.

Operation of the master cylinder 10 will now be described. For the purposes of illustration, the service piston 26 and the compensation piston 82 are to be taken to be in their rest position, as shown in FIG. 1. When braking is desired, the operator of the vehicle depresses a brake pedal which causes the input rod 52 to move in an apply direction, to the right when viewing FIG. 1. The input rod 52 urges the service piston 26 to also move in the apply direction. After a relatively short distance, the first lip seal 38 will move past the first reservoir port 72, thereby preventing fluid communication between the first fluid chamber 60 and the reservoir 70. Simultaneously, the second lip seal 46 will move past the second reservoir port 74, thereby preventing fluid communication between the second fluid chamber 64 and the reservoir 70. At this position, the service piston is said to be in an apply position. Further movement of the service piston 26 in the apply direction causes an increase in the pressure of the fluid within the first and second fluid chambers 60 and 64, thereby generating pressure for the first and second hydraulic brake circuits (not shown) hydraulically connected via the first and second outlet ports 62 and 66.

Preferably, the circular area of the first chamber 60 is equal to the annular area of the second fluid chamber 64 (the diametral area of the second bore section 20 minus the diametral area of the first portion 28 of the service piston 26) so that generally the same volume of fluid is displaced by the first and second fluid chambers 60 and 64 when used or connected to two vehicle hydraulic brake circuits that have essentially identical normal displacement characteristics, such as on a diagonally split brake system. If the two brake circuits have significantly different normal displacement characteristics, the areas of the first and second fluid chambers 60 and 64, can be sized proportionally with respect to each other.

If the circular area of the first chamber 60 is equal to the annular area of the second fluid chamber 64 and the pressures generated within the first or second fluid chamber 60 and 64 are not equal, the compensation piston 82 will move in an axial direction caused by the pressure differential acting across the first and second ends 84 and 88 thereof, thereby balancing or equalizing the pressures within the first and second fluid chambers 60 and 64. A difference in pressure between the first and second fluid chambers 60 and 64 can be caused by various "normal" factors, such as different manufacturing tolerances, uneven pad wear, or differences in piston seal rollback in the various components in first and second hydraulic brake circuits. When the braking force from the input rod 52 is released, the pressure within the first and second fluid chambers 60 and 64 and the force from the return spring 110 will urge the service piston 26 back to its rest position, as shown in FIG. 1.

In the event that either the first or second brake circuits fail and the operator continues to depress the brake pedal, the master cylinder 10 of the present invention provides that the pressure of the non-failed circuit will automatically increase by the amount of the decrease in pressure of the failed circuit. For example, the service piston 26 is in its apply position, as discussed above, and the pressure within the first circuit, and therefore within the first fluid chamber 60, decreases due to a failed circuit, such as by a fluid leak, the compensation piston 82 will be urged rightward, as viewing FIG. 1, against the wall 106 of the spring retainer 96 due to the higher pressure within the second fluid chamber 64 compared to the pressure within the first fluid chamber 60. The pressure within the second fluid chamber 64 will increase proportionally to the decrease in pressure of the first fluid chamber 60. Similarly, if the pressure within the second circuit should fail, the compensation piston 82 will be urged against the end wall 108 and the pressure within the first fluid chamber 60 will increase proportionally to the loss of pressure within the second fluid chamber 64. Therefore, the combined braking force applied to the first and second brake circuits will not be reduced significantly. Because of the relatively small volume of fluid which is displaced into the second fluid chamber 64 due to the movement of the compensation piston 82, the service piston 26, and therefore, the brake pedal will not travel or "drop" a significant amount. Preferably, the compensation assembly 80 is sized so that the volumetric displacement caused by the movement of the compensation piston is fewer than 15 percent of the volume of fluid within the first fluid chamber 60 or the second fluid chamber 64.

The compensation assembly 80 can be designed or "tuned", if desired, to provide for damping of pressure pulses traveling through the fluid within the master cylinder 10, which can cause undesirable hydraulic pulse frequency and noise. The pressure pulses or pressure spikes can be created by the operation of quick acting solenoid valves (not shown) of an anti-lock brake system (not shown). The pressure pulses can also be created by a hydraulic pump (not shown) which commonly generate pressure pulses within each of the first and second brake circuits which are 180 degrees out of phase of each other. The compensation assembly 80 provides at lest three types of damping: fluid inertial damping, fluid viscous damping, and coulomb damping. Damping is the attenuation or reduction of the amplitude of pressure pulses traveling within the fluid by dissipating energy of velocity and/or relative displacement. The inertial fluid damping caused by the Bernoulli force is a function and is controlled by the cross-sectional area of the orifices 56 and 100, the shaped of the edges adjacent the openings of the orifices 56 and 100, and the density of the fluid used. The restricted diameters of the orifices 56 and 100 provides for a pressure drop across the orifices 56 and 100 due to the acceleration of the fluid flowing through the orifices 56 and 100, which causes dissipation of energy. The fluid viscous damping is a function of and is controlled by the cross sectional area of the orifices 56 and 100, the axial length of the orifice, the shape of the orifices 56 and 100, and the viscosity of the brake fluid used. The orifices 56 and 100 provide for viscous shear force damping due to the shear force created in the boundary layer on the internal wall surfaces of the orifices 56 and 100, which causes dissipation of energy. The coulomb damping is a function of the coefficient of friction between the seal 92 and the internal wall of the axial bore 54, the normal or radial force exerted by the seal 40 on the internal wall of the axial bore 54, the number of seals used, and the structure of the seal 86. The damping characteristics of the seal 92 can be enhanced by changing the structure of the seal 92. For example, the seal 92 can have a larger or smaller contact area or additional seals can be added to the compensation piston 80, for example a pair of lip seals.

It should be understood that the seals 38, 40, 46, 48, and 92 can be any suitable seal structure, such as a lip seal or an O-ring seal, and not limited to the illustrated structure as shown in FIG. 1.

Figure 2:
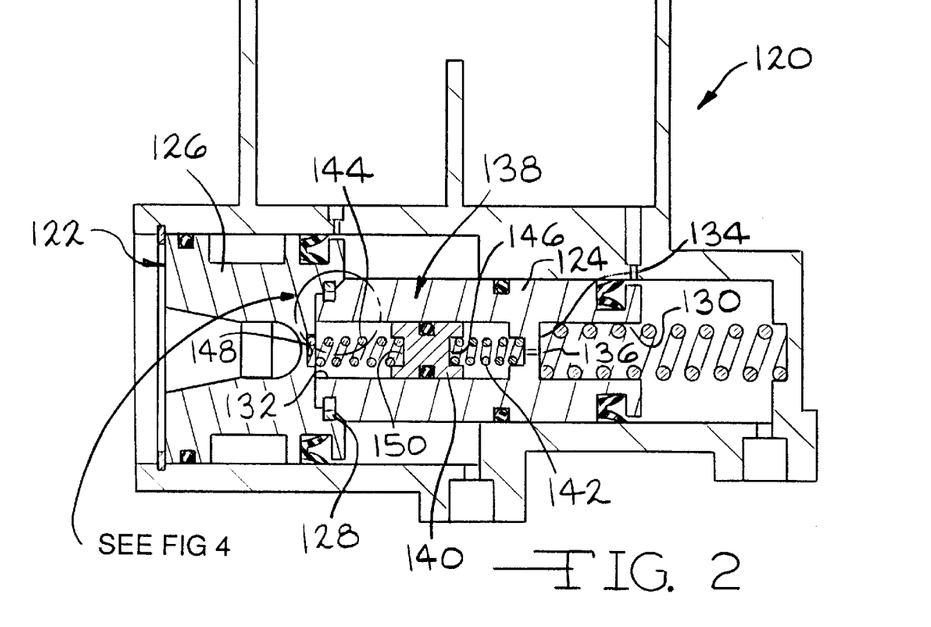
FIG. 2 is a sectional view of a second embodiment of master cylinder, in accordance with the invention.

FIG. 2 is an illustration of a second embodiment of a master cylinder, indicated generally at 120, in accordance with the present invention. The master cylinder 120 is generally similar in function and structure to the master cylinder 10 of FIG. 1, except has a service piston 122 comprised of two separate cylindrical structures: a first portion 124 and a second portion 126. Features of the master cylinder 120 which are not discussed are similar in function to like features in the master cylinder 10 of FIG. 1.

The first portion 124 of the service piston 122 defined by an outer diameter which is less than an outer diameter defined by the second portion 126. The first portion 124 is coupled to the second portion 126 by a spring clip 128, which will be discussed in detail below. The first portion 124 has first and second axial bores 130 and 132, respectively, with a radial wall 134 therebetween. The radial wall 134 has a passageway or orifice 136 extending axially therethrough. The orifice 136 provides for damping of pressure pulses traveling through the fluid within the master cylinder 120 in the same manner as the orifices 56 and 100 of the master cylinder 10 of FIG. 1.

The master cylinder 120 has a compensation assembly 138 which is similar in structure and function to the compensation assembly 80 of the master cylinder 10 of FIG. 1. The compensation assembly 138 has a compensation piston 140 slidably disposed within the second axial bore 132 and is positioned therein by a pair of springs 142 and 144. The spring 142 is positioned between the radial wall 134 and a first end 146 of the compensation piston 140. The spring 144 is positioned between an end wall 148 of the second portion 126 of the service piston 122 and a second end 150 of the compensation piston 140.

Figures 3, 4:
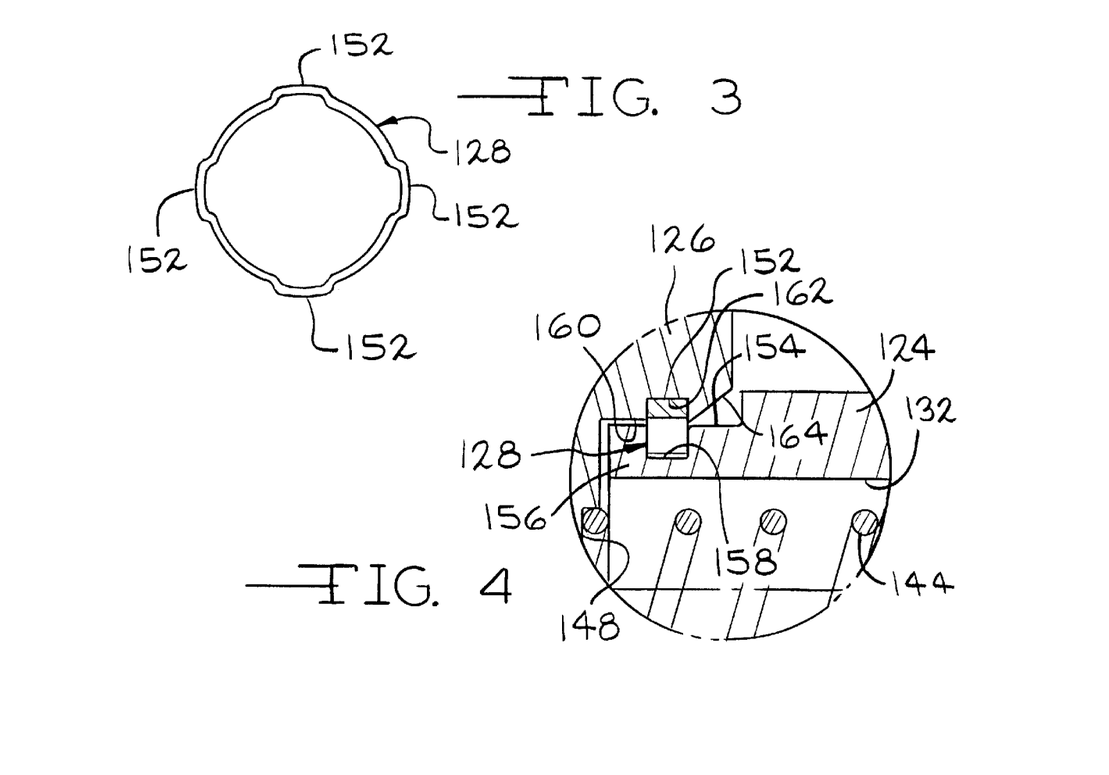
FIG. 3 is a view of a spring clip used in the master cylinder of FIG. 2.
FIG. 4 is an enlarged sectional view of a portion of the master cylinder of FIG. 2.

As shown in FIG. 3, the spring clip 128 has a generally circular shape with a plurality of laterally outwardly extending portions 152. Although the spring clip 128 is shown having a generally rectangular cross-section, as best seen in FIG. 4, the spring clip 128 can have any suitable cross-sectional shape, such as circular. To couple the first portion 124 to the second portion 126, the spring clip 128 is expanded to slip axially over an outer cylindrical surface 154 of an axially extending portion 156 of the first portion 124. The spring clip 128 then snaps into, and is retained within an annular groove 158 formed in the axially extending portion 156. The axially extending portion 156 is then inserted into a circular recess 160 formed in the end wall 148 of the second portion 126. This insertion causes laterally inward compression of the extending portions 152 of the spring clip 128. The extending portions 152 of the spring clip 128 will expand into an outwardly extending annular groove 162 formed on the inner surface of the circular recess 160 when the first portion 124 has moved a sufficient distance to radially align the annular groove 158 with the annular groove 162. A chamfered surface 164 is provided at the open end of the circular recess 160 for assisting in the installation of the spring clip 128. The spring clip 128 minimizes the relative axial motion of the coupled first and second portions 124 and 126 while permitting limited lateral motion to accommodate any normal tolerance stackups of the various structures of the master cylinder 120.

Due to the two piece construction of the service piston 122 of the master cylinder 120, the separate spring retainer 38 of the master cylinder 10 of FIG. 1, can be eliminated by utilizing the radial wall 134 as an end stop. Before the first and second portions 124 and 126 are coupled together, the pair of springs 142 and 144 and the compensation piston 140 can be inserted into the second axial bore 132.

It is contemplated that the first and second portions 124 and 126 may suitably be manufactured without a spring clip 128 or means for coupling the first and second portions 124 and 126 together, or that the first and second portions 124 and 126 may become uncoupled during use. Such an arrangement would normally function similarly to the service piston 122.

Figure 5:
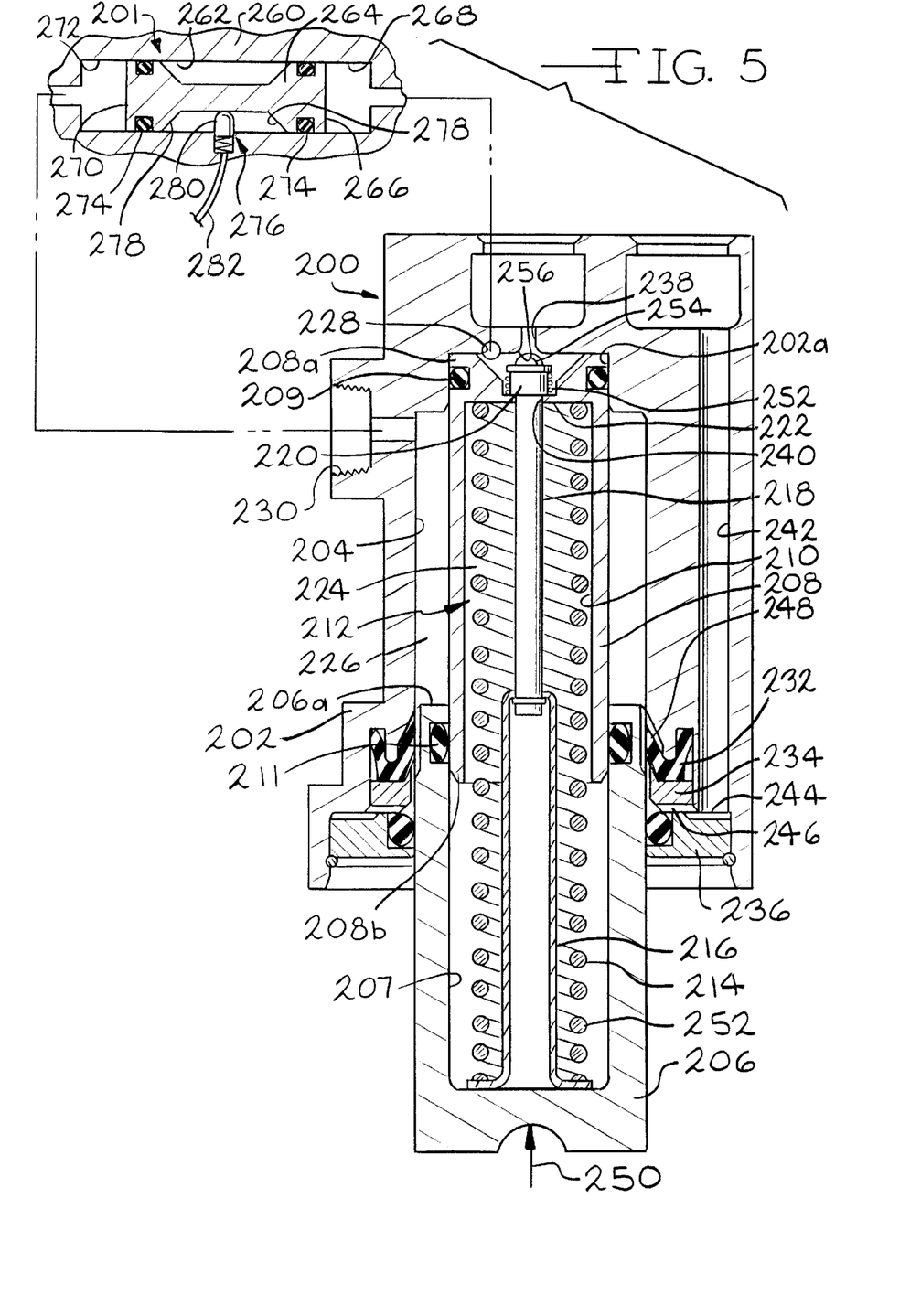
FIG. 5 is a sectional view of a third embodiment of a master cylinder.

FIG. 5 illustrates a third embodiment of a master cylinder, indicated generally at 200, which is in fluid communication with a remotely located compensation assembly, indicated generally at 201. The master cylinder 200 is oriented vertically for a more compact arrangement and is adapted to engage with cooperating brake pedal linkages (not shown) which are structured for transmitting a vertical input force to the service piston. The master cylinder 200 includes a housing 202 having a bore 204 formed therein. A single cup-shaped service piston 206 having a bore 207 formed therein is slidably disposed within the bore 204 of the housing 202. The service piston 206 has a tubular shaped end 206a. A generally tubular sleeve 208 having first and second ends 208a and 208b, respectively, is disposed within the bore 204 of the housing 202. The sleeve 208 has an axial through bore 210 formed therethrough. The first end 208a of the sleeve 208 is seated in a recess 202a formed in the housing 202 and is sealingly engaged therewith by an elastomeric seal 209. The second end 208b of the sleeve 208 is disposed within the bore 207 of the service piston 206 and sealingly engaged therewith by an elastomeric seal 211. Due to the seating arrangement of the first end 208a of the sleeve 208 in the recess 202a and the seal 211, the sleeve 208 and the service piston 206 has limited radial movement therebetween by the compression of the material of the seals 209 and 211. This limited radial movement provides for less strict manufacturing tolerances in the dimensions for the various structures of the master cylinder 200.

The master cylinder 200 further includes a caged spring assembly 212 positioned within the bore 207 of the service piston 206 and the bore 210 of the sleeve 208. The caged spring assembly 212 includes a coil spring 214, a retainer sleeve 216, and a pin 218. The pin 218 has a radially extending head portion 220 which is retained by a radially inwardly extending shoulder 222 formed in the sleeve 208. The caged spring assembly 212 biases the service piston 206 in a direction downwardly, as viewing FIG. 5, from the bore 204 of the housing 202.

A first fluid chamber 224 is generally defined by the cooperation of the bore 210 of the tubular sleeve 208 and the bore 207 of the service piston 206. An annular second fluid chamber 226 is generally defined by the cooperation of the tubular end 206a, the bore 204 of the housing 202, and the outer surface of the sleeve 208. Outlet ports 228 and 230 formed through the housing 202 are in fluid communication with the first and second chambers 224 and 226, respectively, which are connected to first and second hydraulic brake circuits (not shown).

The open end of the bore 204 is sealed by a lip seal 232, a back-up ring 234, and an annular end plug 236. The first fluid chamber 224 is in fluid communication with a reservoir (not shown) via a conduit or passageway 238 formed in the housing 202 and through an opening 240 formed in the shoulder 222 formed in the sleeve 208. The second fluid chamber 226 is in fluid communication with the reservoir via a conduit 242, radially extending grooves 244 formed in the end plug 236, radially extending grooves 246 formed in the back-up ring 234, and around an extending inner lip 248 of the lip seal 232 which engages the outer surface of the service piston 206.

Upon actuation, the service piston 206 is moved upwardly, from the position depicted in FIG. 5, by an input force, indicated by an arrow 250. The movement of the service piston 206 causes the pin 218 of the caged spring assembly 212 to move upwardly by the urging of a spring 252 which engages the head 220 of the pin 218 and the shoulder 222 of the sleeve 208. The head 220 of the pin 218 includes a semi-spherical tip 254 which engages a valve seat 256 formed in the outlet port 228 when the pin 218 has moved a sufficient distance. When the semi-spherical tip 254 engages the valve seat 256, fluid is prevented from flowing between the reservoir and the first fluid chamber 224. The lip seal 232 prevents fluid from flowing from the reservoir to the second fluid chamber 226. Further movement of the service piston 206 causes the pressures to increase in the first and second fluid chambers 224 and 226, respectively.

The remotely located compensation assembly 201 is in fluid communication with the master cylinder 200 to provide for equalization of the pressures in the first and second fluid chambers 60 and 64. The compensation assembly 201 includes a housing 260 having a bore 262 formed therein. The housing 260 can be another portion of the housing 202 of the master cylinder 200 or can be a separate structure. A compensation piston 264 is slidably disposed within the bore 262. The compensation piston 262 has a first end 266 facing a first portion 268 of the bore 262 which is in fluid communication with the first fluid chamber 224 of the master cylinder 200. The compensation piston 262 has a second end 270 facing a second portion 272 of the bore 262. A pair of seals 274 are mounted on the compensation piston 262 and slidably engage the inner wall of the bore 262.

The compensation assembly 201 can be optionally equipped with a brake failure switch 276 which indicates loss of fluid pressure in either the first or second fluid chambers 224 or 226. For example, a loss of pressure in the first fluid chamber 224 would cause rightward movement of the compensation piston 262, in FIG. 5. A sufficient movement of the compensation piston 262 would cause an annular sloped surface 278 of the compensation piston 262 to depress a switch or button 280 downwardly a sufficient distance until an electrical contact was made. The failure signal would be transmitted through a wire 282 which preferably is connected to an audible or visual indicator to alert the operator of the vehicle of the presence of a large imbalance between the first and second fluid chambers 224 and 226. Note that the compensation piston 262 can move a predetermined distance either in a rightward or leftward direction before triggering the button 280. This design can thus allow a "normal" amount of movement of the compensation piston 262 (for compensation) without activating the alarm. The compensation assembly 201 may also include a pair of opposing springs (not shown) which centrally bias the compensation piston 262 with respect to the switch 276.

Figure 6:
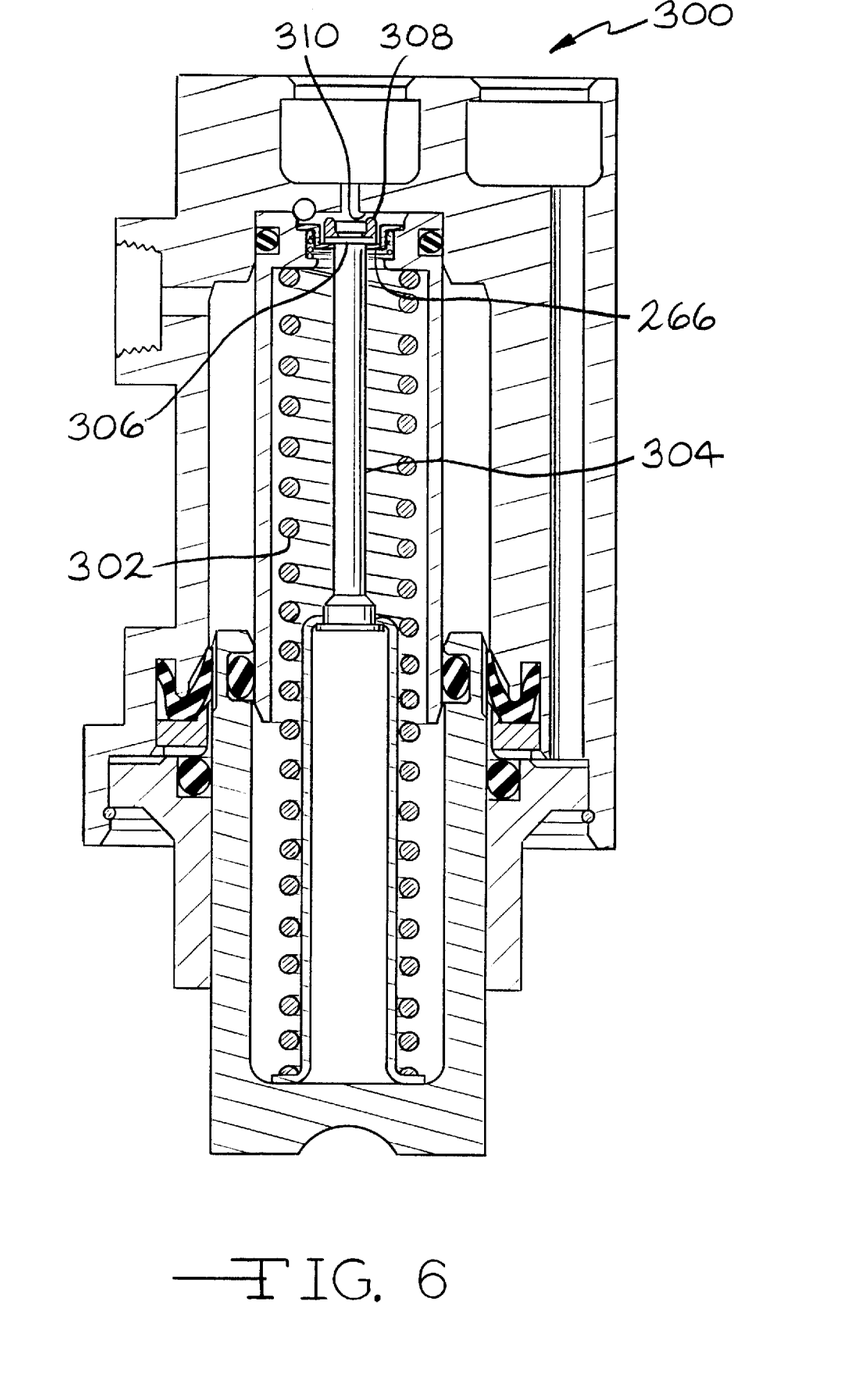
FIG. 6 is a sectional view of a fourth embodiment of a master cylinder, in accordance with the invention.

FIG. 6 is an illustration of a fourth embodiment of a master cylinder, indicated generally at 300. The master cylinder 300 is similar to the master cylinder 200 of FIG. 5, except that a caged spring assembly 302, a pin 304 provided with a radially extending head portion 306 which includes an annular elastomeric seal 308 for sealing against a radially extending wall 310 formed in a housing 312.

Figure 7:
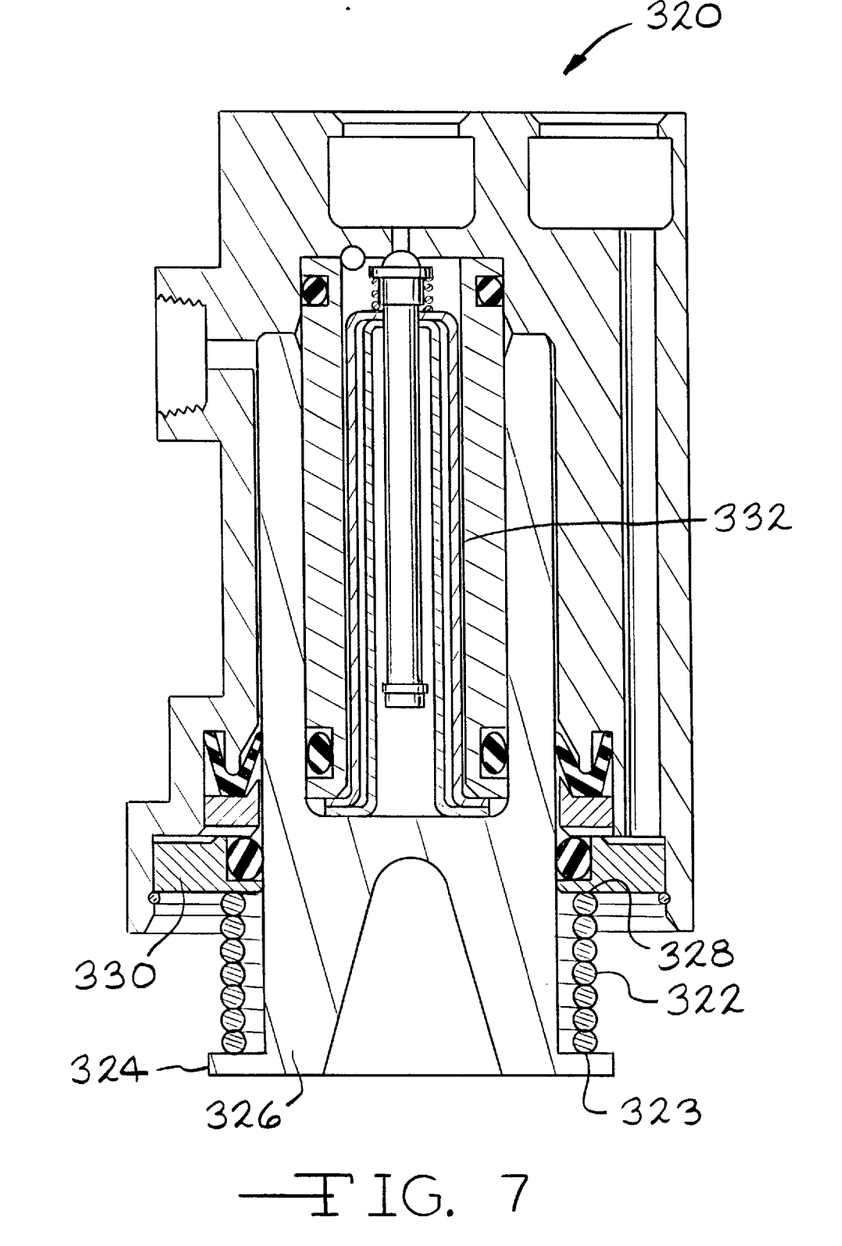
FIG. 7 is a sectional view of a fifth embodiment of a master cylinder, in accordance with the invention.

FIG. 7 is an illustration of a fifth embodiment of a master cylinder, indicated generally at 320. The master cylinder 320 is shown at its fully stroked position. The master cylinder 320 is similar to the master cylinder 200 of FIG. 5, except that a caged spring assembly 332 includes a return coil spring 322 having a first end 323 acting upon a radially extending flange 324 of a service piston 326, and a second end 328 acting upon an end plug 330.

Figure 8:
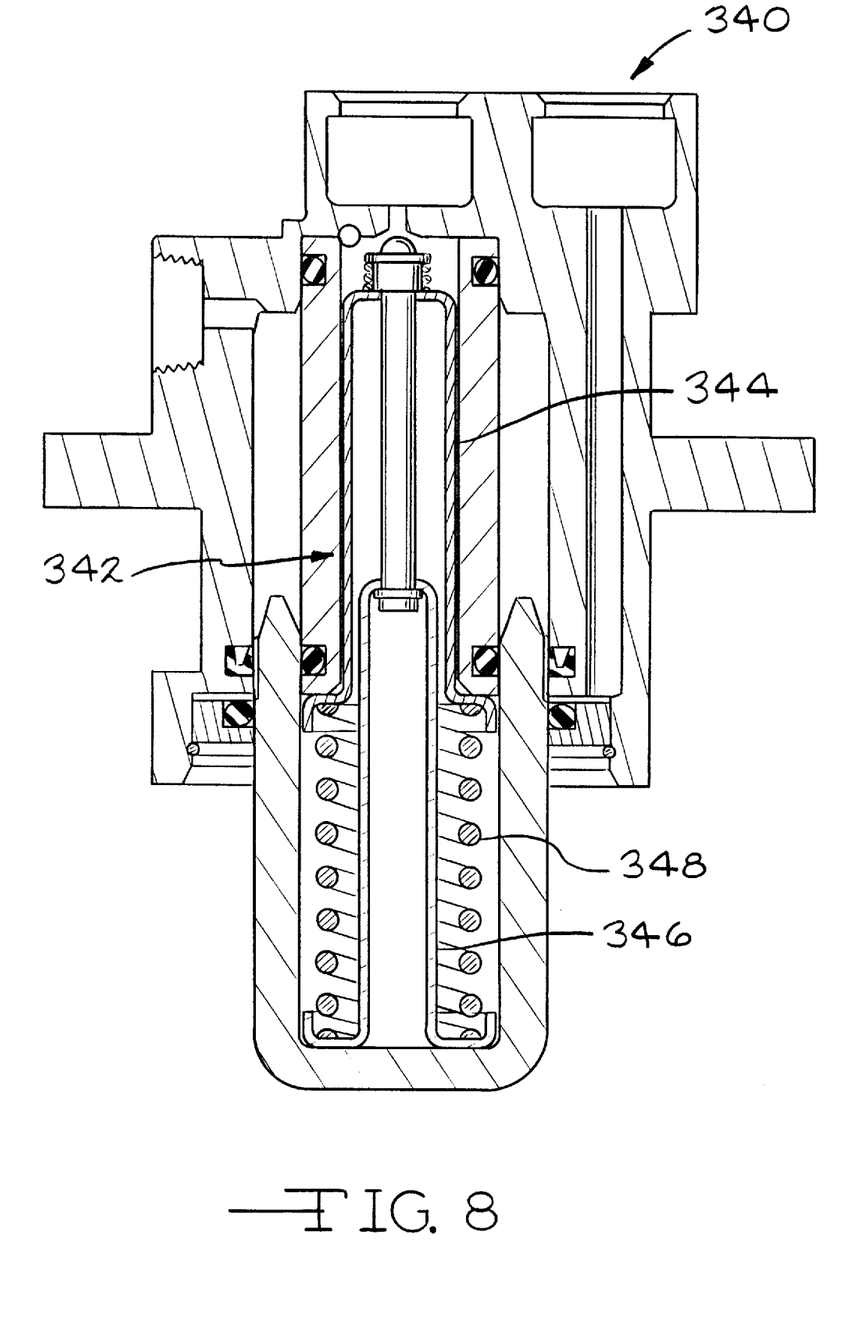
FIG. 8 is a sectional view of a sixth embodiment of a master cylinder, in accordance with the invention.

FIG. 8 is an illustration of a sixth embodiment of a master cylinder, indicated generally at 340. The master cylinder 340 is similar to the master cylinder 200 of FIG. 5, except that a having a caged spring assembly 342 includes first and second retainers 344 and 346, respectively, biased apart from each other by a coil spring 348.

The principle and mode of operation of this invention have been explained and illustrated in its preferred embodiment. However, it must be understood that this invention may be practiced otherwise than as specifically explained and illustrated without departing from its spirit or scope. For example, while the invention has been described in the embodiments of brake system master cylinders, the principles of operation of this invention may be more broadly applied to hydraulic power cylinders powering multiple hydraulic fluid circuits other than braking circuits.

What is claimed is:

1. A power cylinder comprising:

a housing having a bore formed therein;

a service piston slidably disposed within said bore of said housing, said service piston having first and second walls, said first wall defining a first boundary wall of a first fluid chamber defined within said bore of said housing, said second wall defining a second boundary wall of a second fluid chamber defined within said bore of said housing; and a compensation assembly including:
  a compensation housing having a bore formed therein, said compensation housing having a first orifice formed therein which is in fluid communication with said bore of said compensation housing and said first fluid chamber, said compensation housing having a second orifice formed therein which is in fluid communication with said bore of said compensation housing and said second fluid chamber, said first and second orifices having relatively small cross-sectional areas;
  a piston slidably disposed within said bore of said compensation housing; and
  a seal seated on said piston and sealingly engaging a cylindrical wall defined by said bore formed in said compensation housing, wherein the coefficient of friction between said seal and said cylindrical wall cooperates with said first and second orifices to dampen pressure pulses traveling through fluid contained within said first and said second fluid chambers.

2. The power cylinder of claim 1, wherein said compensation housing is formed within said service piston.

3. The power cylinder of claim 1, wherein the piston has a sloped side with respect to the direction of travel of the piston within the bore of the compensation housing, said power cylinder further including a brake failure switch having a button extending in said bore of said compensation housing, wherein sufficient travel of said piston causes said sloped side to depress said button, thereby activating said brake switch.

4. A power cylinder comprising:

a housing having first and second bore sections formed therein; and a service piston including:

a first portion slidably disposed in said first section of said bore in an axial direction, said first portion having a recess formed therein and defining a wall; and a second portion slidably disposed in said second section of said bore in said axial direction said second portion being coupled to said first piston for substantially preventing axial movement therebetween, said second portion having an end extending in said recess of said first portion such that an annular gap exists between said wall and said end of said second portion, thereby permitting limited radial movement between said first portion and said second portion.

5. The power cylinder of claim 4, wherein said first portion has a first annular groove formed in said recess extending radially outwardly, said second portion having a second annular groove formed in said end extending radially inwardly, said power cylinder further including a circular spring clip disposed in said first and second annular grooves, thereby coupling said first portion to said second portion.

6. The power cylinder of claim 5, wherein said circular spring clip has a plurality of radially extending portions extending in one of said first or second annular grooves.

7. The power cylinder of claim 4, wherein said first portion has a chamfered surface formed therein adjacent said recess.

8. A power cylinder comprising:

a housing having first and second bore sections formed therein; and a service piston including:

a first portion slidably disposed in said first section of said bore, said first portion including an end having a recess formed therein, said recess defining an annular wall, said end of said first portion defining a first boundary wall of a first fluid chamber defined within said bore first section of said of said housing;

a second portion slidably disposed in said second section of said bore and coupled to said first portion, said second portion having a first end extending in said recess of said first portion such that an annular gap exists between said annular wall of said first portion and said end of said second portion, thereby permitting limited radial movement between said first portion and said second portion, said second portion having a second end defining a second boundary wall of a second fluid chamber defined within said second section of said bore of said housing; and a compensation housing having a bore formed therein, said compensation housing having a first orifice formed therein which is in fluid communication with said bore of said compensation housing and said first fluid chamber, said compensation housing having a second orifice formed therein which is in fluid communication with said bore of said compensation housing and said second fluid chamber, said first and second orifices having relatively small cross-sectional areas;

a piston slidably disposed within said bore of said compensation housing; and a seal seated on said piston and sealingly engaging a wall defined by said bore formed in said compensation housing, wherein the coefficient of friction between said seal and said wall cooperates with said first and second orifices to dampen pressure pulses traveling through fluid contained within said first and said second fluid chambers.

9. The power cylinder of claim 8, wherein said compensation housing is formed in said second portion.

10. The power cylinder of claim 8, wherein said first portion has a first annular groove formed in said recess extending radially outwardly, said second portion having a second annular groove formed in said first end extending radially inwardly, said power cylinder further including a circular spring clip disposed in said first and second annular grooves, thereby coupling said first portion to said second portion.

11. The power cylinder of claim 10, wherein said circular spring clip has a plurality of radially extending portions extending in one of said first or second annular grooves.

12. The power cylinder of claim 8, wherein said first portion has a chamfered surface formed therein adjacent said recess.

13. A power cylinder comprising:

a housing having a central bore formed therein;

a non-foraminous cup shaped service piston slidably disposed in said bore of said housing, said service piston including a tubular shaped end having a central bore formed therein defining a first boundary wall of a first fluid chamber defined within said bore of said housing, said tubular shaped end defining a second boundary wall of a second fluid chamber defined within said bore of said housing; and a compensation assembly including:

a compensation housing having a bore formed therein, said compensation housing having a first orifice formed therein which is in fluid communication with said bore of said compensation housing and said first fluid chamber, said compensation housing having a second orifice formed therein which is in fluid communication with said bore of said compensation housing and said second fluid chamber, said first and second orifices having relatively small cross-sectional areas;

a piston slidably disposed within said bore of said compensation housing; and a seal seated on said piston and sealingly engaging a cylindrical wall defined by said bore formed in said compensation housing, wherein the coefficient of friction between said seal and said cylindrical wall cooperates with said first and second orifices to dampen pressure pulses traveling through fluid contained within said first and said second fluid chambers.

14. A power cylinder comprising:

a housing having first and second bore sections formed therein; and a service piston including:

a first portion slidably disposed in said first section of said bore, said first portion having a recess formed therein and defining a wall, said first portion having a first annular groove formed in said recess;

a second portion slidably disposed in said second section of said bore and coupled to said first piston, said second portion having an end having a second annular groove formed therein, said end extending in said recess of said first portion such that an annular gap exists between said wall and said end of said second portion, thereby permitting limited radial movement between said first portion and said second portion; and a circular spring clip disposed in said first and second annular grooves, said spring clip having a plurality of radially extending portions extending in one of said first or second annular grooves, thereby coupling said first portion to said second portion.

* * * * *

UNITED STATES PATENT AND TRADEMARK OFFICE
CERTIFICATE OF CORRECTION

PATENT NO. : 5,890,364
DATED : April 6, 1999
INVENTOR(S) : Herbert L. Linkner, Jr., and Wendell D. Tackett It is certified that error appears in the above-identified patent and that said Letters Patent is hereby corrected as shown below:

Column 11, Claim 8, Line 10, change "within said bore first section of said of said housing;" to -- within said first bore section of said housing; --.

Signed and Sealed this

Twenty-eighth Day of December, 1999

Attest:

Q. TODD DICKINSON

Attesting Officer

Acting Commissioner of Patents and Trademarks